Fig. 1

INVENTORS
DONALD J. WHEELER
VICTOR LOHRENZ
BY Oberlin, Maky & Donnelly
ATTORNEYS

Fig. 2

INVENTORS
DONALD J. WHEELER
VICTOR LOHRENZ

BY Oberlin, Maky & Donnelly
ATTORNEYS

INVENTORS
DONALD J. WHEELER
VICTOR LOHRENZ

BY Oberlin, Maky & Donnelly
ATTORNEYS

INVENTORS
DONALD J. WHEELER
VICTOR LOHRENZ

BY Oberlin, Maky & Donnelly
ATTORNEYS

INVENTORS
DONALD J. WHEELER
VICTOR LOHRENZ

BY Oberlin, Maky & Donnelly
ATTORNEYS

April 16, 1968  D. J. WHEELER ET AL  3,378,185
METHOD AND APPARATUS FOR JOINING STRIP AND SHEET MATERIAL
Filed Oct. 11, 1965  6 Sheets-Sheet 6

INVENTORS
DONALD J. WHEELER
VICTOR LOHRENZ

BY Oberlin, Maky & Donnelly
ATTORNEYS

United States Patent Office 3,378,185
Patented Apr. 16, 1968

3,378,185
METHOD AND APPARATUS FOR JOINING STRIP AND SHEET MATERIAL
Donald J. Wheeler, Kent, and Victor Lohrenz, Bedford, Ohio, assignors to Guild Metal Joining Equipment Company, Bedford, Ohio, a corporation of Ohio
Filed Oct. 11, 1965, Ser. No. 494,728
20 Claims. (Cl. 228—5)

ABSTRACT OF THE DISCLOSURE

A combination shear assembly and weld assembly each mounted for movement in the same transverse path across strips to be joined thereby assuring perfect alignment of the weld assembly with the edges of the strips subsequent to the shearing operation. The movable shear assembly is pivotally mounted on a carriage for pivotal swinging movement into and out of strip pass height, and clamping means are provided for continuously clamping strips during both shearing and welding and while the strips are indexed from the shear position to the weld position.

---

The present invention relates generally, as indicated, to a method and apparatus for joining strip and sheet material and, more particularly, to a process and apparatus for shearing and joining the ends of metal, plastic, or coated metal strips and sheets for continuous strip processing operations.

In mills or lines for processing metal or plastic strips and webs, the leading end of a new strip must be joined to the trailing end of the strip just processed in a quick and accurate manner if the lines are to operate substantially continuously. Of course, the joint between the two strip ends must be of sucfficient tensile strength that it will not break during processing and must be without irregularities that could damage the processing equipment or tools in the line, such as reducing or forming rolls, brushes, cut-offs, and blanking, stamping, or other processing equipment. However, since the joint is generally cut out as scrap during the processing operation, it is apparent that the least expensive and most economical joint having the requisite strength and lack of surface irregularities is most desirable.

In most cases, it is very difficult to join quickly strip ends that do not meet perfectly with each other, and accordingly it is generally necessary to combine with the strip joining apparatus a shearing apparatus for accurately shearing the ends of the strip prior to joining, which substantially increases the size and cost of the machine.

It is therefore a principal object of this invention to provide a novel combination shearing and welding apparatus which is relatively inexpensive and compact as compared to previously known combination shearing and welding apparatus.

Another object is to mount such a combination shearing and welding apparatus on a common carriage.

Another object is to provide an apparatus for joining strip materials which may be operated either manually or automatically quickly to join strip ends in a highly economical manner.

Yet another object is to provide a novel method for producing quickly and economically a high strength strip joint regardless of the strip end conditions, and utilizing a minimum amount of joint material.

A yet further object is to provide a combination shearing and welding apparatus with means for insuring accurate alignment of the weld unit with the sheared strip ends.

Another principal object is to provide novel combination shear-weld clamps which may be used as pressure pads for shearing and also as holding clamps for indexing the sheared ends to the weld position and maintaining such sheared ends in perfect alignment during the welding operation.

Yet another object is to provide a novel method and clamp for gripping the trailing end of the exit strip during shearing and welding, wherein such trailing end is indexed from the weld position to the shear position to provide sufficient slack in the strip for indexing back to the weld position subsequent to the shearing operation, and from the shear position to a retracted position to allow unlimited entry strip end cropping.

Still another object is to provide a clamp of the type described including a clamping beam which is adapted to be rotated and an actuating post which is adapted to be retracted to allow removal of the clamp from the strip.

Another object is to provide the moveable slitter knives of the shearing apparatus with a guide shoe for establishing positive alignment between the moveable shear knives and stationary blades and to maintain the required separation between the stationary shear blades during shearing.

Another object is to provide such a shearing apparatus with pivotally mounted moveable shear knives and novel means for precisely setting the desired clearance between such moveable shear knives and the stationary shear blades.

Yet another object is to provide such a combination shearing and welding apparatus with an insulated weld back-up bar and insulated clamps for containing the welding arc and thereby protecting the stationary shear blades.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principle of the invention may be employed.

Figure 1:
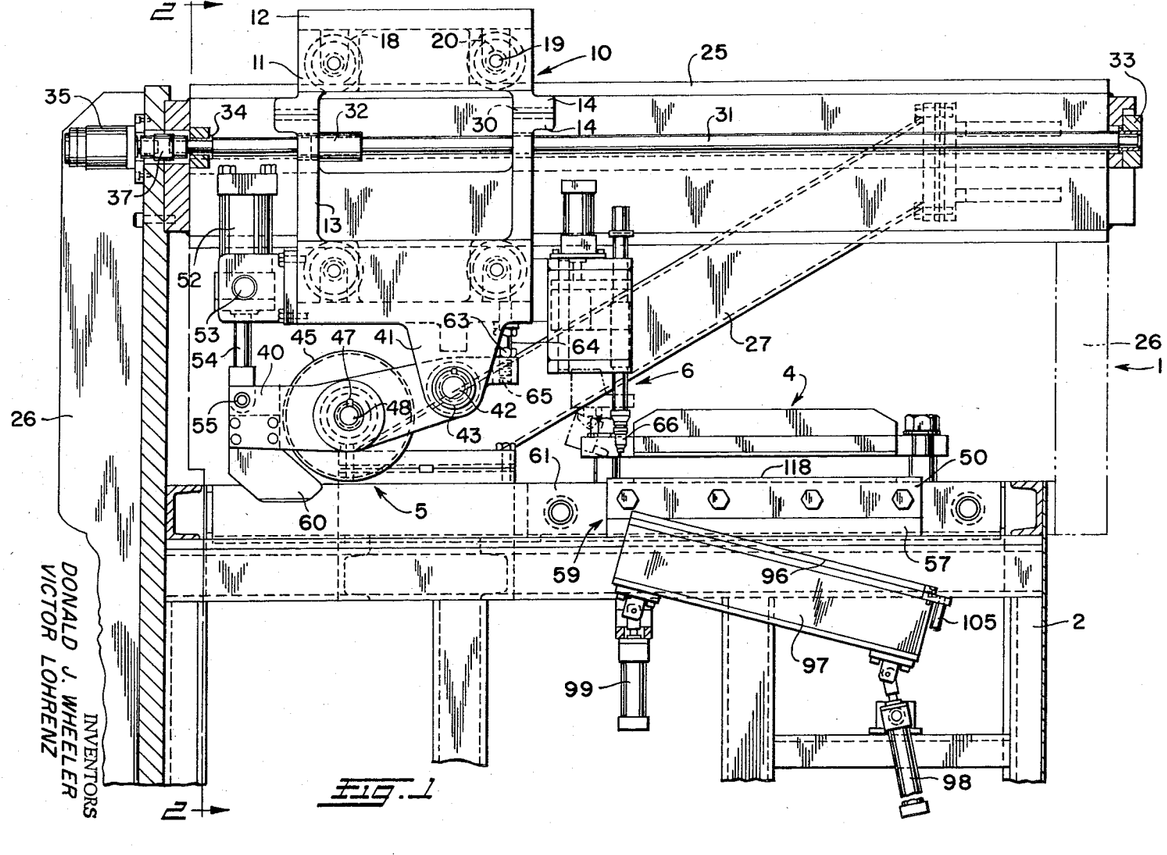
FIG. 1 is a longitudinal, partial vertical section of a preferred form of combination strip shearing and joining apparatus in accordance with the present invention.
Figure 2:
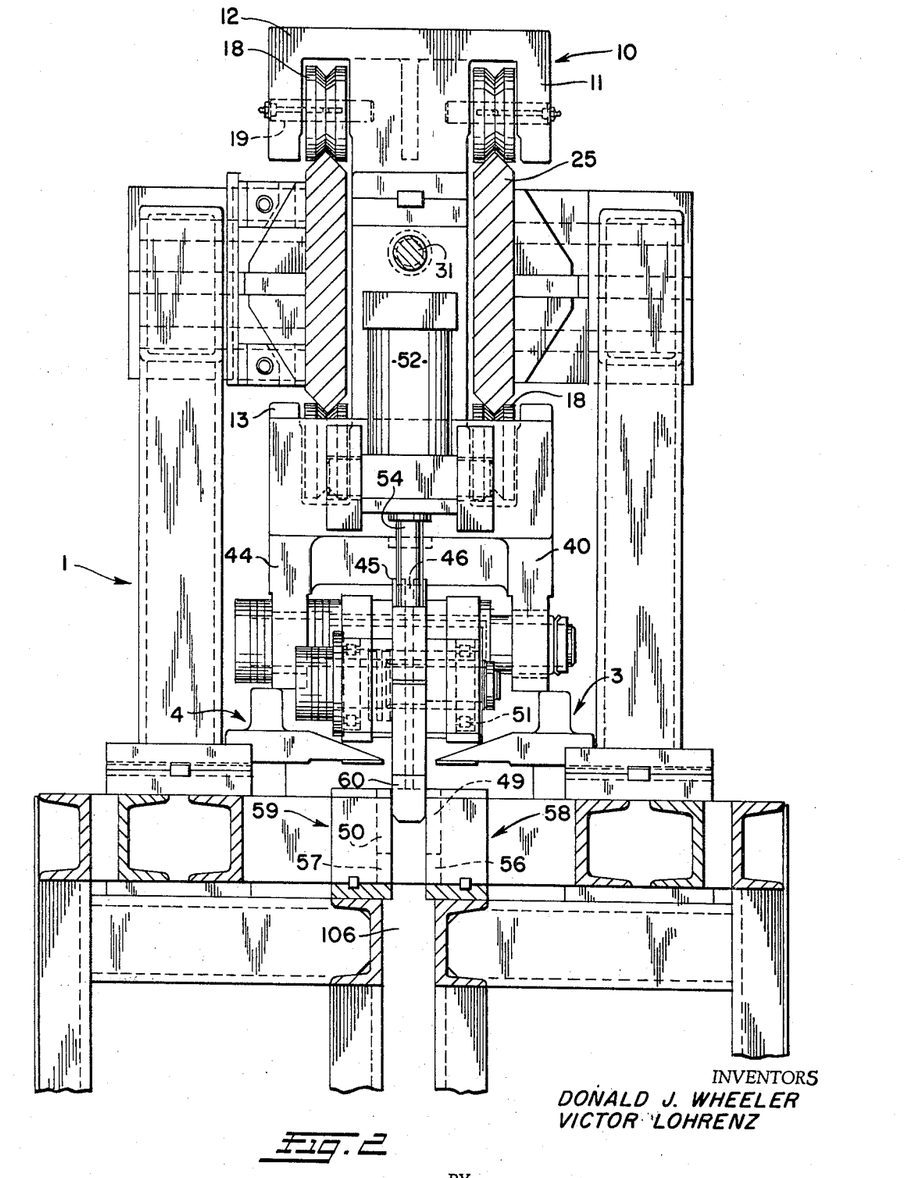
FIG. 2 is a transverse vertical section of the apparatus of FIG. 1 taken on the plane of the line 2—2 thereof.

Referring now in detail to the annexed drawing and first of all to FIGS. 1 and 2, a preferred embodiment of strip joining apparatus in accordance with the present invention is generally indicated at 1 and comprises a main frame 2 on which there is mounted a pair of combination shear and weld clamp assemblies 3 and 4, a slitter shear assembly 5, and weld head assembly 6. The main frame 2 may be either stationary as illustrated in FIGS. 1 and 2, or supported on wheels 7 guided by rails 8 (see FIG. 3) for movement between two or more strip processing lines. Otherwise, the apparatus of the FIG. 3 embodiment is quite similar to that of the FIGS. 1 and 2 embodiment and accordingly the same reference numerals followed by prime symbols (') are used to designate like parts.

The slitter shear assembly 5 and the weld head assembly 6 may be mounted on a single carriage 10 above the combination shear and weld clamp assemblies 3 and 4 for transverse movement across the strips being processed. The carriage housing 11 is usually made of steel preferably cast in two parts, an upper housing part 12 and a lower housing part 13, each of which is provided with out-turned flanges 14 which may be locked together by suitable clamps, not shown. Secured to each of the carriage housing parts 12 and 13 are four hardened steel grooved wheels 18 carried by shafts 19 mounted in bushings 20.

Figures 3, 4:
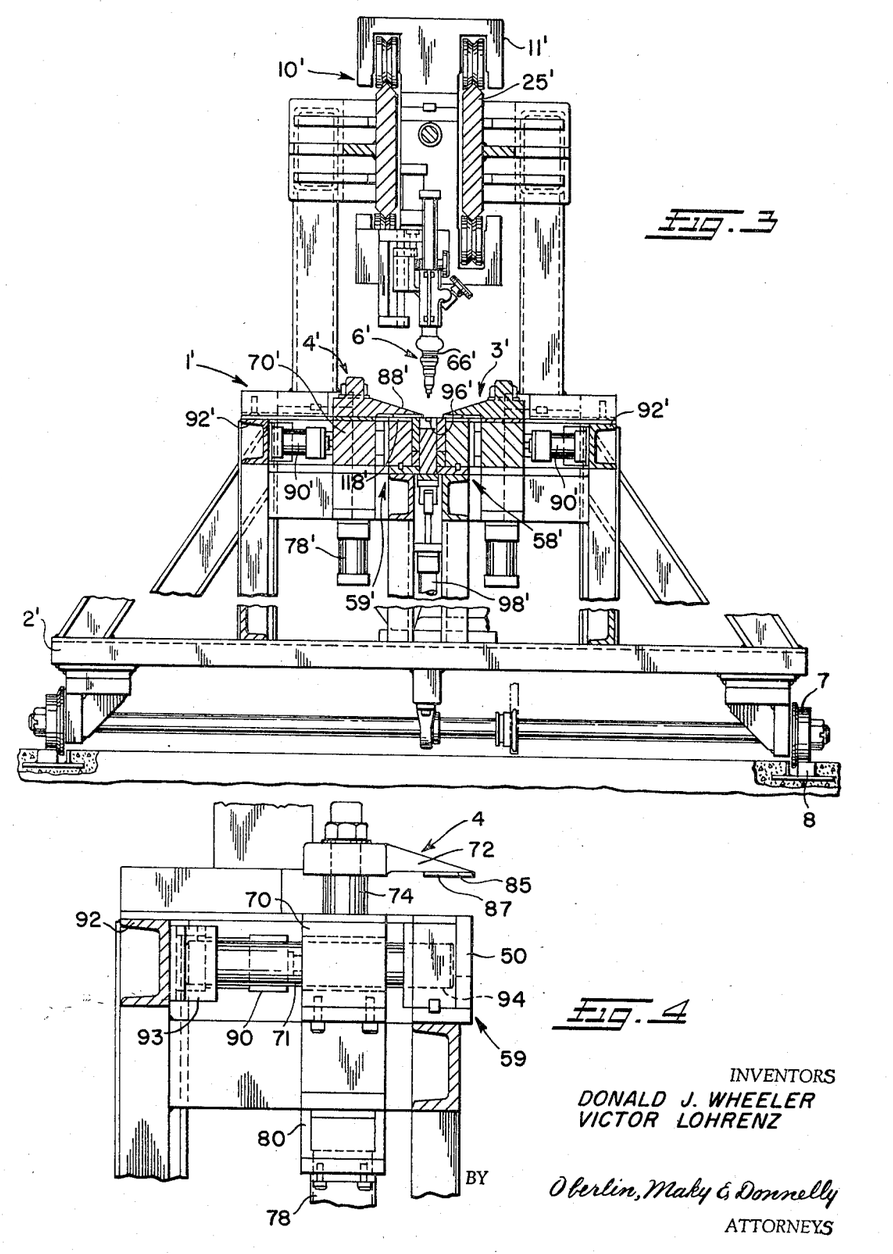
FIG. 3 is a transverse vertical section of another form of combination strip shearing and welding apparatus in accordance with this invention.
FIG. 4 is an enlarged end elevation view of one of the combination shear-weld clamps for the apparatus.

The wheels 18 ride on two heavy welded beam rails 25 which may be supported by a pair of fixed braces 26 shown in solid lines in FIG. 1 and a cross tie brace 27 to permit the apparatus 1 when mounted on wheels as in the FIG. 3 embodiment to be moved out of the line of strip to an adjacent line and vice versa, whereby a single strip joining apparatus could be used for two or more processing lines. Alternatively, two pairs of braces 26 could be used, one at each end of the rails, especially if the apparatus 1 were to be a permanent installation.

The distance between the flanges 14 of the housing parts 12 and 13 may be varied as desired by inserting shims 30 between such flanges to place the proper preload on the carriage 10 for eliminating any play between the carriage wheels 18 and guide rails 25 which might affect the required accuracy for the shearing and welding operations. For driving the carriage 10 along the guide rails 25, there is provided a carriage drive screw 31 threadedly engaging a nut 32 in the carriage 10 and supported at its ends by bushings 33 and 34, such drive screw 31 being adapted to be driven in either direction by a reversible motor 35 mounted on the support brace 26 and connected to the drive screw by a drive coupling 37.

The slitter shear assembly 5 comprises a main support beam 40 pivotally connected to the downwardly projecting portion 41 of the carriage 10 as by means of a pivot pin 42 and bushing 43. The main support beam 40 has a yoke type bearing support frame 44 for supporting a pair of slitter knives 45 with a spacer 46 therebetween keyed at 47 to an arbor 48 supported in radial and thrust bearings 51 in the support frame 44. The slitter knives 45 are adapted to be raised above and lowered to the strip shearing height whereat the slitter knives 45 will pass between a pair of stationary shear knives 49 and 50 upon actuation of a shear actuating cylinder 52 mounted on trunnions 53 in the lower housing part 13. The rod 54 for the cylinder 52 is pivotally connected to the main support beam 40 at 55.

The stationary shear knives 49 and 50 are supported by backups 56 and 57 which form a part of the shear block assemblies 58 and 59 carried by the main frame 1. The spacing and alignment of the stationary shear knives 49 and 50 with respect to the carriage mounted slitter knives 45 are such that as the carriage 10 moves in the direction of the cutting edges of the stationary knives with the slitter shear assembly 5 lowered to shear pass height, the slitter knives 45 will be received between the stationary shear knives. However, there are occasions when, due to play in the pivot connection 42 between the main support beam 40 and the carriage 10 or for other reasons, there is slight misalignment between the moveable slitter knives 45 and the stationary knives 49 and 50, which results in extreme wear or even chipping or breaking of the shear knives. To eliminate completely any possibility of such misalignment. There is provided a slitter shear guide shoe 60 on the main support beam 40 adjacent the slitter knives 45 for receipt between the stationary shear knives 49 and 50 and shear knife extensions 61 to serve as a guide for the moveable slitter knives 45 and also maintain the proper spacing between such stationary shear knives.

The extent to which the slitter shear assembly 5 may be lowered is limited by engagement of an adjustable screw 64 on the main support beam 40 with the bottom of the carriage 10, such screw 64 being threadedly received in a tapped opening 65 in such main support beam and projecting upwardly therefrom. Thus, it is a simple matter to set precisely the desired amount of positive or negative clearance between the moveable slitter knives 45 and the stationary knives 49 and 50 in accordance with the type and thickness of strip being sheared, it only being necessary to loosen the jam nut 63 and rotate the screw 64 to the selected position. Adjustment of the screw 64 will likewise be necessary after regrinding of the slitter knives 45 or after they have substantially worn.

Also mounted on the carriage 10 adjacent the slitter shear assembly 5 is the weld head assembly 6, which may be in the form of the torch 66 shown for arc welding, or alternatively it may be a seam welding wheel, spot welding electrodes, spot stitch equipment, or gas welding apparatus, for example, or flash butt welding apparatus could be used, depending upon the type of weld desired. Because the slitter shear assembly 5 and weld head assembly 6 are mounted on the same carriage 10, perfect alignment of the welding equipment with the sheared edges of the strips to be joined is assured. Moreover, only one work station is required for both the shearing and welding operations, rather than two, the overall result being a substantial reduction in the size and cost of the apparatus. However, it is apparent that the slitter shear assembly 5 and weld head assembly 6 could be mounted on separate carriages if desired. Moreover, other equipment could also be mounted on the same or separate carriages, including a planisher or grinder.

Figure 5:
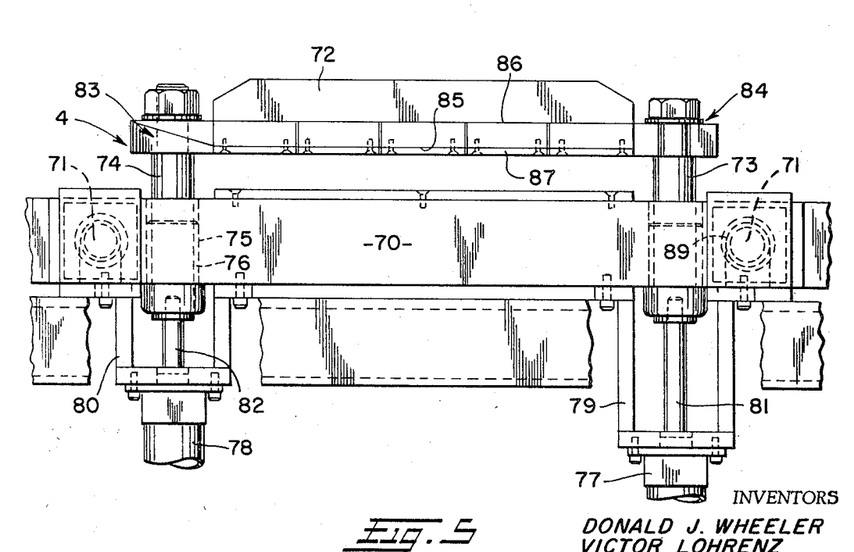
FIG. 5 is a top plan view of the clamp of FIG. 4.

The strips to be joined are clamped by the combination shear and weld clamp assemblies 3 and 4 during both the shearing and welding operations. Since the structure of the combination shear-weld clamp assemblies 3 and 4 are substantially identical, only the exit clamp assembly 4 will be discussed in detail. As perhaps best seen in FIGS. 4–6, the clamp assembly 4 generally comprises a platen 70 mounted for horizontal movement on a pair of laterally spaced support shafts 71, and an elongated clamping beam 72 mounted for vertical movement toward and away from the platen 70, such clamping beam 72 being carried by a pair of posts 73 and 74 extending through apertures 75 in the platen 70 and supported therein by bushings 76. Raising and lowering of the posts 73 and 74 is effected by actuation of their respective post cylinders 77 and 78 which are mounted on the platen 70 as by means of brackets 79 and 80 with their operating rods 81 and 82 suitably coupled to the respective posts.

Figure 6:
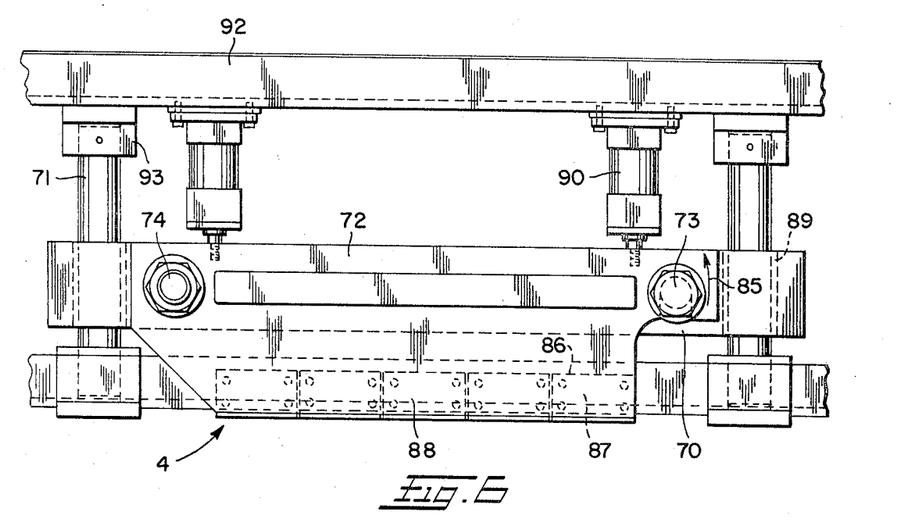
FIG. 6 is a front elevation view of such clamp.

Preferably, there is a pivot connection 83 between one of the posts 74 and the clamping beam 72, and a releasable lock connection 84 between the other post 73 and such clamping beam 72 to permit the clamping beam to be rotated approximately 60 degrees in the direction of the arrow 85, FIG. 6, from the position shown, and the post 73 to be lowered out of the way, whereby the strip of sheet material may be elevated and the entire apparatus 1 retracted and moved to another processing line if mounted on wheels as in the FIG. 3 embodiment. However, if the apparatus 1 is not needed for other processing lines, it may be a fixed installation as shown in FIGS. 1 and 2 and the clamping beam 72 and posts 73 and 74 may be die set constructed and operated by a single post cylinder 77 or 78.

In the preferred form illustrated, the clamping beam 72 is made from a non-ferrous material segmented along the clamping edge 85 by machined slots 86 in which there are disposed clamp inserts 87 for equalizing the pressure applied to a clamped strip. The inserts 87 may be made from an insulating material to insulate the clamping nose 88 from the strip and to provide both electrical and heat insulation for the stationary shears 49 and 50, in a manner which will be made apparent hereafter.

The platen 70 is supported on the shafts 71 by suitable bushings 89 for indexing by actuation of a pair of indexing cylinders 90 from a welding position to a shearing position, and then from the shearing position to a retract position and back to the welding position, as will be later described. As can be seen in FIGS. 3 and 6, the indexing cylinders 90 or 90' are attached to the channel members 92 of the main frame 2, as are the supports 93 for one of the ends of the shafts 71. The other ends of the shafts 71, on the other hand, are received in recesses 94 in the exit shear block assembly 59.

The clamping nose 88 or 88' of the clamping beam 72 substantially overhangs the platen 70 and even extends inwardly of the shear block assemblies 58 and 59 when the clamp assemblies 3 and 4 are in the welding position shown in FIG. 3 in order to press the strip firmly against the weld backup bar 96 and flatten the strip ends prior to welding. Because the clamping nose 88 and weld clamp inserts 87 are insulated, the clamp inserts 87 may be as close as 1/32 inch to the weld joint and electrical or thermal damage will still not occur.

The weld backup bar 96 is supported by an insulated housing 97 which is adapted to be moved between the inoperative and operative positions shown in FIGS. 1 and 3, respectively, upon actuation of a pair of elevating cylinders 98 and 99. When elevated, the backup bar 96 is raised into position and guided between the stationary shear knives 49 and 50, and is provided with a ground connection 105 (FIG. 1) which permits the backup bar to be used with any welding process, such as tungsten inert gas, metal inert gas, seam, spot, projection, plasma, or electron beam welding. The insulated weld backup bar 96, in addition to supporting the strips pressed thereagainst by the clamp assemblies 3 and 4 during the welding operation, also cooperates with the insulated weld clamp inserts 87 to contain the welding arc and protect the stationary shear knives 49 and 50 from the extreme heat.

When the weld backup bar 96 is returned to the inoperative position subsequent to the welding operation, it desirably cams into position a scrap chute 106 which receives the sheared scrap and covers the backup bar to prevent the scrap metal from damaging the same.

*Operation*

Figure 7:
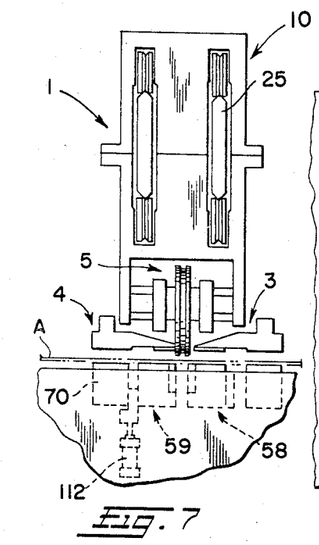
FIGS. 7–14 are schematic diagrams showing progressively the various steps which are followed in the shearing and joining of strip ends using the apparatus of the present invention.
Figure 8:
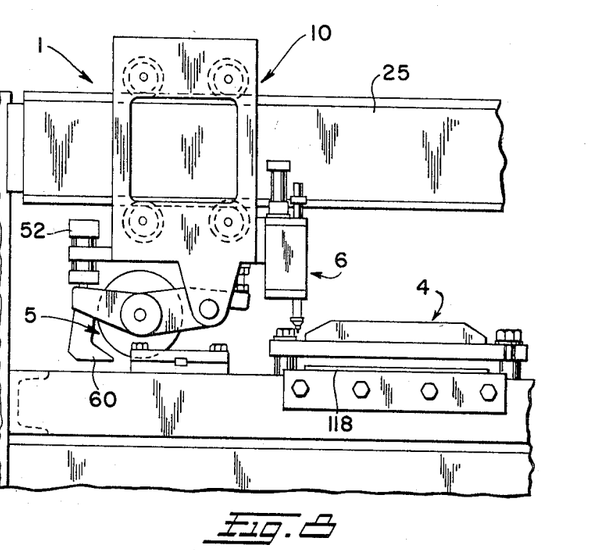

Referring next to FIGS. 7 through 14, the operation of the apparatus 1 will now be set forth. FIGS. 7 and 8 show the strip shearing and welding apparatus 1 in the line operating position with both of the clamps 3 and 4 open and the entry clamp 3 located in the shear position and the exit clamp 4 located in the weld position with the combination shear-weld carriage 10 located in the retracted position out of the path of the line, whereby a strip A is permitted to pass through the apparatus 1 unobstructed to the various stations downstream whereat operations are performed thereon. When the trailing end 110 of the strip A approaches the apparatus 1, the operator or an automatic device, not shown, determines the length of scrap to be cut therefrom, at which point the strip is stopped at the exit clamp 4 and the post cylinders 77 and 78 (see FIGS. 4–6) are actuated to cause lowering of the exit clamping beam 72 to secure the strip on the exit clamp platen 70 and shear block assembly 59. Next the exit clamp 4 is indexed from the weld position shown in FIG. 9 to the shear position of FIG. 10, thereby forming a hump 111 in the strip to provide sufficient slack for indexing back to the welding position subsequent to the shearing operation.

Figure 9:
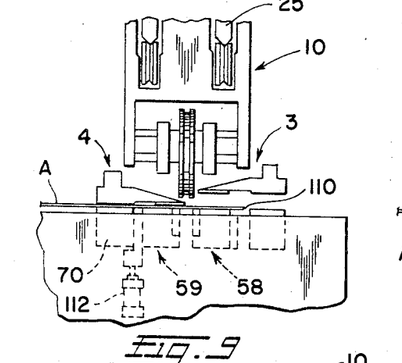
Figure 10:
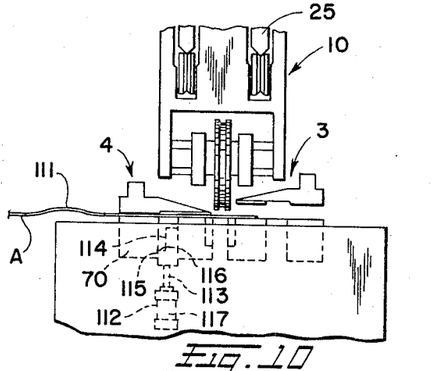

A gap control mechanism 112 may be provided between the exit platen 70 and the shear block assembly 59 for accurately locating the strip ends at both the weld and shear positions. As seen in FIGS. 9 and 10, for example, the gap control mechanism 112 comprises a gap blade 113 provided with two gauging surfaces 114 and 115 with a shoulder 116 therebetween, and a piston cylinder 117 for actuating the same. The gap blade 113 may be moved between a first position whereat the gauging surface 114 establishes a specified gap between the clamp platen 70 and shear block assembly 59 to locate the strip end 110 for welding, and a second position whereat the gauging surface 115 is disposed between platen 70 and shear block assembly 59 to locate such strip end at the shear position.

To facilitate movement of the exit clamp 4 from the weld position to the shear position and vice versa with the clamping beam 72 lowered, the shear block assembly 59 is provided with a low friction facing plate 118 for supporting the lower side of the strip surface during indexing.

Figure 11:
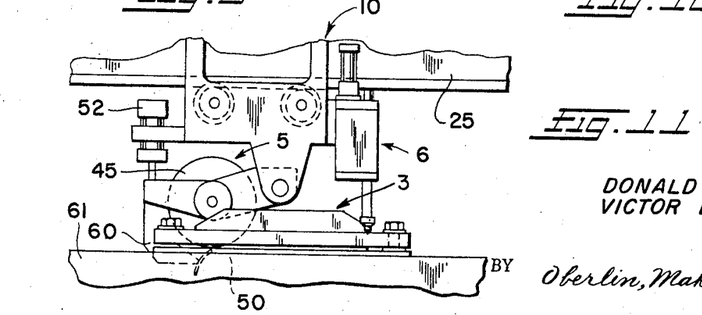

With the trailing end 110 of the strip A firmly held in the shear position of FIG. 10, the slitter shear assembly 5 is lowered and the carriage 10 is caused to start its travel across the strip, making sure that the slitter guide shoe 60 enters the lead in plates or shear knife extension 61 (FIG. 11) positively to align the slitter shear knives 45 with the stationary shear knives 49 and 50 and to insure proper blade separation between the stationary knives. As the carriage 10 traverses the strip, the slitter knives 45 cut scrap material from the strip which is deposited onto the scrap chute 106, with the guide shoe 60 engaging the scrap to direct it toward the scrap chute.

Figure 12:
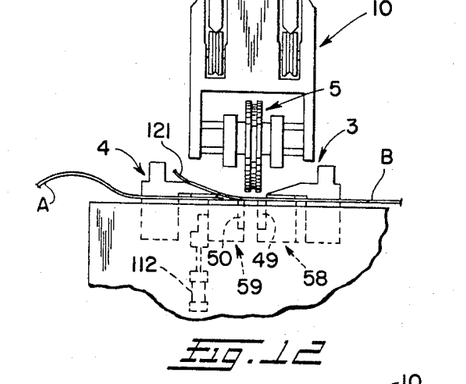

At the termination of the exit shear cycle, the shear elevating cylinder 52 elevates the slitter shear assembly 5 and the motor 35 causes the carriage 10 to return to the starting point or retract position. Next the exit clamp 4 indexes the sheared strip A to the exit end of the apparatus as shown in FIG. 12, thereby exposing the entire cutting edge of the exit shear block assembly 59 to permit any desired length of the leading end 121 of a new strip B to be sheared to project beyond the entry clamp 3. The entry clamp 3 is then caused to close securely to clamp the new strip B on the entry shear block assembly 58, and the carriage 10 is again caused to traverse the stationary shear knives 49 and 50 with the moveable slitter knives 45 lowered to the pass height position to cut the leading end of the strip B and deposit the scrap on the scrap chute 106.

Figure 13:
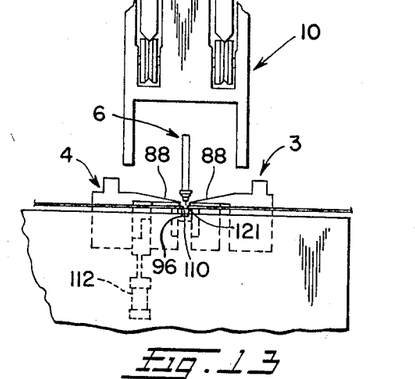

Now both the entry clamp 3 and exit clamp 4 are indexed to move the strip ends 110 and 121 to the weld position shown in FIG. 13, the exact positioning of both of the clamps being determined by separate gap control mechanisms 112, only one of which is illustrated. As evident, the strip ends may be overlapped, butted, or gapped, as desired.

Figure 14:
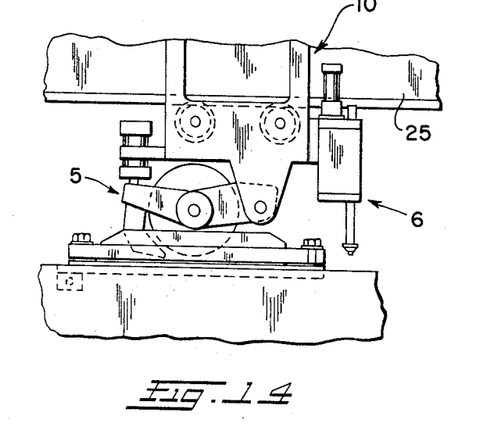

With the strip ends in the weld position, the weld backup bar 96 is elevated to press the strip ends against the clamping noses 88 of the clamps 3 and 4 and thus flatten the strip ends prior to joining. Then the weld head assembly 6 is lowered to the weld position with the slitter shear assembly 5 raised (FIG. 14), and the carriage 10 is caused to travel across the strips to its original starting position, welding the strip ends together during the pass.

After completion of the weld, the weld head assembly 6 is raised and the clamps 3 and 4 are opened and returned to their original starting positions illustrated in FIGS. 7 and 8, thereby permitting the clamping beams 72 to be pivoted and the posts 73 lowered for removal of the strip where the apparatus is mounted on wheels so that the apparatus 1 may be moved to a second processing line; or if the apparatus is stationary, the clamps 3 and 4 are merely retracted to their open positions and the weld backup bar 96 is lowered.

From the above discussion, it is now apparent that novel method and apparatus described herein are very effective for producing quickly and economically a high strength strip joint regardless of the strip end conditions.

The arrangement of the exit and entry clamps of the apparatus allows unlimited lengths of scrap to be cropped from the ends of the strips to be joined, and once the strip ends are clamped, they are continuously gripped both during the shearing and joining operations so as to eliminate any possibility of strip misalignment. Moreover, because the shearing and welding assemblies are mounted on the same carriage for movement on rails extending transversely across the strips, perfect alignment of the weld assembly with the sheared edges is assured, and the overall size and cost of the apparatus is substantially reduced.

Other modes of applying the principle of the invention may be employed, change being made as regards the details described, provided the features stated in any of the following claims or the equivalent of such be employed.

We, therefore, particularly point out and distinctly claim as our invention:

1. An apparatus for joining metal strip comprising a frame, a pair of strip clamping beams mounted on said frame for movement toward and away from each other between a welding position and a shear position for the strips clamped thereby, a pair of stationary shear knives located at such shear position, a movable shear assembly, means mounting said movable shear assembly for transverse movement across the strips at such shear position, said movable shear assembly having slitter knife means mounted for movement into a position whereat said slitter knife means cooperate with said stationary shear knives to shear one or the other of such strips during such transverse movement, a welding assembly, and means mounting said welding assembly for movement in the same transverse path as said movable shear assembly for joining said strips together when in the welding position.

2. The apparatus of claim 1 wherein said movable shear assembly and welding assembly are both mounted on a single carriage supported on rails for movement together, whereby perfect alignment of said welding assembly with the sheared edges of the strips is assured.

3. The apparatus of claim 1 wherein said frame is supported on wheels for movement of the entire apparatus between two or more strip processing lines.

4. The apparatus of claim 2 wherein said carriage comprises two separate housing parts, one of which has a plurality of wheels mounted thereon in contact with the upper surface of said rails, and the other of which has a plurality of wheels in contact with the lower surface of said rails, and means for varying the vertical distance between said wheels to place the desired amount of pre-load on said carriage by said rails.

5. The apparatus of claim 1 wherein said means mounting said movable shear assembly for transverse movement as aforesaid comprises carriage supported on rails above said frame.

6. The apparatus of claim 5 further comprising means for pivotally mounting said movable shear assembly to said carriage for pivotal movement into and out of strip shearing height.

7. The apparatus of claim 6 further including means for precisely locating said movable shear knife means at the desired strip shear height comprising an adjustable nut threaded on a screw projecting from said carriage and extending into an opening in the main support frame for said movable shear assembly, said adjustable nut being adapted to engage said shear assembly main support frame to stop further movement thereof toward said stationary knives.

8. The apparatus of claim 1 further comprising a guide shoe means mounted on said shear assembly for movement therewith, said guide shoe means being adapted to be received between said stationary shear knives to guide said movable shear knife means therebetween and maintain the proper spacing between said stationary shear knives.

9. The apparatus of claim 1 wherein each of said strip clamping means comprises a platen, means mounting said platen for horizontal movement between such shear and weld positions as aforesaid, an elongated clamping beam, a pair of laterally spaced posts extending through said platen for supporting said clamping beam, cylinder means operatively connected to said posts for causing vertical movement of said clamping beam toward and away from said platen, and means mounting said clamping beam for limited pivotal movement about one of said posts to a position permitting the removal of a strip therefrom.

10. The apparatus of claim 1 wherein said strip clamping means comprises a platen, means mounting said platen for horizontal movement between such shear and weld positions as aforesaid, an elongated clamping beam, and means mounting said clamping beam on said platen for vertical movement toward and away from said platen, said clamping beam substantially overhanging said platen by a distance sufficient to permit said clamping beam to press the respective strips firmly against the adjacent stationary shear knives when said strip clamping means is in the shearing position, and firmly against a weld backup bar moved into position between said stationary shear knives when said clamping means is in the welding position.

11. The apparatus of claim 10 wherein both said clamping beam and said backup bar are insulated to protect said stationary shear knives from the heat during the welding operation.

12. The apparatus of claim 10 wherein said clamping beam is made from a non-ferrous material with slots along its clamping edge for receipt of inserts for equalizing the pressure applied to the clamped strips.

13. In combination, a shear assembly and weld assembly for joining metal strips for use in continuous strip processing lines and the like, a frame, a carriage for said shear assembly, and means mounting said carriage on said frame for transverse movement across the strips to progressively shear the strips with said shear assembly located at strip pass height, wherein the improvement comprises a support beam pivotally mounted on said carriage, and means mounting said shear assembly on said support beam for pivotal swinging movement of said shear assembly into and out of strip pass height.

14. A clamping assembly for releasably clamping strip material comprising a platen, means mounting said platen for horizontal movement between a shear and weld position, an elongated clamping beam, a pair of laterally spaced vertical posts extending through said platen for supporting said clamping beam, the spacing between said posts being sufficient to receive the strip material therebetween, cylinder means operatively connected to said posts for causing vertical movement of said clamping beam toward and away from said platen for clamping and releasing the strip material, and means mounting said clamping beam for limited pivotal movement about one of said posts to a position clear of the other of said posts permitting the removal of such strips from between said posts.

15. The clamping assembly of claim 14 wherein said clamping beam substantially overhangs said platen by a distance sufficient to permit said clamping beam to press a strip firmly against a stationary slitter knife when said clamping assembly is in the shear position, and firmly against a weld backup bar when said clamping assembly is in the weld position.

16. The clamping assembly of claim 15 wherein said clamping beam is made from a non-ferrous material with slots along its clamping edge for receipt of inserts for equalizing the pressure applied to the clamped strip material.

17. A shear assembly for shearing strip material comprising a frame, a carriage, means mounting said carriage on said frame for transverse movement across the strip material, a support beam on said carriage, shear means mounted on said support beam for shearing the strip material during transverse movement of said carriage across the strip material with said shear means disposed at strip pass height, and means pivotally mounting said support beam on said carriage for pivotal swinging movement of said shear means into and out of strip pass height.

18. The shear assembly of claim 17 wherein said carriage comprises two separate housing parts, one part having a plurality of wheels mounted thereon in contact with the upper surface of rails on said frame, and the other part having a plurality of wheels in contact with the lower surface of said rails, and means for varying the vertical distance between said wheels to place the desired amount of pre-load on said carriage by said rails.

19. The shear assembly of claim 17 further comprising means for precisely locating said shear means at strip pass height comprising an adjustable nut threaded on a screw projecting from said carriage into an opening in said support beam, said adjustable nut being adapted to engage said shear means and support beam to locate said shear means at strip pass height.

20. The shear assembly of claim 17 further comprising a guide shoe mounted on said support beam for movement therewith, said guide shoe being adapted to be received between stationary shear knives to guide said movable shear means and maintain the proper spacing between said stationary shear knives.

References Cited
UNITED STATES PATENTS

| | | | |
|---|---|---|---|
| 3,198,931 | 8/1965 | Klempay | 228—5 |
| 3,298,587 | 1/1967 | Seeloff | 228—5 |
| 3,286,342 | 11/1966 | Seeloff et al. | 228—5 |
| 3,131,663 | 5/1964 | Lawson | 228—6 |

RICHARD H. EANES, Jr., *Primary Examiner.*